June 4, 1963     J. E. LAMKIN     3,092,738
CONTROL FOR WATER SOFTENING APPARATUS
Filed Aug. 17, 1961     2 Sheets-Sheet 1

James E. Lamkin
INVENTOR.

BY Floyd Trimble
Attorney

June 4, 1963  J. E. LAMKIN  3,092,738
CONTROL FOR WATER SOFTENING APPARATUS
Filed Aug. 17, 1961  2 Sheets-Sheet 2

James E. Lamkin
INVENTOR.

BY Floyd Trimble
Attorney

United States Patent Office 3,092,738
Patented June 4, 1963

3,092,738
CONTROL FOR WATER SOFTENING APPARATUS
James E. Lamkin, Tulsa, Okla., assignor of seventeen and one-half percent to Wiley W. Lowrey, Jr., and seventeen and one-half percent to William M. Majors, Jr., both of Oklahoma City, Okla.
Filed Aug. 17, 1961, Ser. No. 132,230
4 Claims. (Cl. 307—118)

This invention relates to a control for use with water softening apparatus and more particularly it relates to a control whereby the water softening apparatus used in conjunction with this control may be operated in an economical and efficient manner.

As is well known to those skilled in the art, all water from whatever source contains certain materials as impurities which make the water more or less hard. This is true even of rain water. This hardness varies from less than one grain for rainwater to many grains per gallon for water from numerous wells. It is also well known that hardness in water is objectionable for both economic and health reasons.

Because of the numerous advantages of soft water over hard water, various methods have been proposed for softening water. These methods have included the employment of certain compositions which may be added directly to the water by the consumer and those employing an ion exchange material. In the latter method, which is more satisfactory, the calcium and magnesium ions (the cause of hardness in water) are exchanged for sodium ions. The ultimate result is that calcium and magnesium salts are converted to sodium salts. Although the use of an ion exchange resin a heretofore employed is the preferred method of the two, it is not entirely satisfactory. This is true because the ion exchange resin becomes exhausted after a certain volume of water flows through it and must be regenerated which is accomplished by treating exhausted resin with a sodium chloride solution followed by washing with fresh water to remove excess sodium chloride. Such a procedure is rather complictated and time consuming.

In an attempt to overcome the foregoing disadvantages automatic means for accomplishing the water cycle of operation including the three stages of from service to regeneration, from regeneration to backwash and from backwash back to service have been proposed. When such means are used all that is required of the consumer is to add salt periodically to a hopper. While such automatic means have been used rather extensively the results obtained thereby are neither economical nor efficient. This is true because in these automatic methods a clock, after a certain predetermined period shuts off the water flow to the water softener and controls the regeneration and backwash cycles after which the softener is returned to the water softening cycle. This time interval is only approximately related to the actual water usage which is the actual factor determining when the ion-exchange resin requires regeneration. The usual practice is to have a bed of ion-exchange resin of such size that regeneration is relatively infrequent, on the order of once a week. The timer is set such that it will effect regeneration in a low use period such as the early hours of the morning. While regeneration is taking place, untreated water is bypassed to serve any demand that might occur. Provision is made for increasing the frequency of regeneration by changing settings on the timer in one day increments. Thus, where the capacity of the water softener is designed for an 8-day normal regeneration cycle, it may have 8 settings whereby the frequency of regeneraton may be increased from once in 8 days to once daily, This arrangement is not entirely satisfactory and is wasteful. If the softener is set so that it is regenerated before the ion-exchange resin is spent under any rate of water use, then when normal or low use periods occur, salt is wasted. If on the other hand, it is set to regenerate after a normal period of use, then occasionally hard water will pass the spent softener bed after an abnormal use period and will cause dissatisfaction.

Soft water requires less detergent for washing, shorter cooking time, and less coffee and tea to give the same strength as hard water. So much so, that a few grains rise in water hardness per gallon, after becoming adjusted to using soft water, will disrupt household operations. Further since once hard water is allowed to enter the system it requires a long period of time before the hardness is reduced to a satisfactory level by dilution. It is, therefore, very desirable that this condition not be allowed to occur. It is possible to have two tanks which are alternately used thereby being able to effect regeneration at any time. But without a more accurate means of taking into account water usage than that offered by the present timer and without some means of compensation for fluctuations in usage, no distinct advantage is realized from such an arrangement.

It is, therefore, a principal object of my invention to provide a control for use with a water softening apparatus which obviates the disadvantages of the prior art devices of this character.

It is another object of this invention to provide a control for use with a water softening apparatus whereby the water softening process may be carried out in a simple and economical manner.

It is another object of the present invention to provide a control for use with a water softening apparatus whereby the water softening cycle of operation is dependent upon the volume of water passing through the water softening apparatus.

Other objects and advantages of the present invention will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
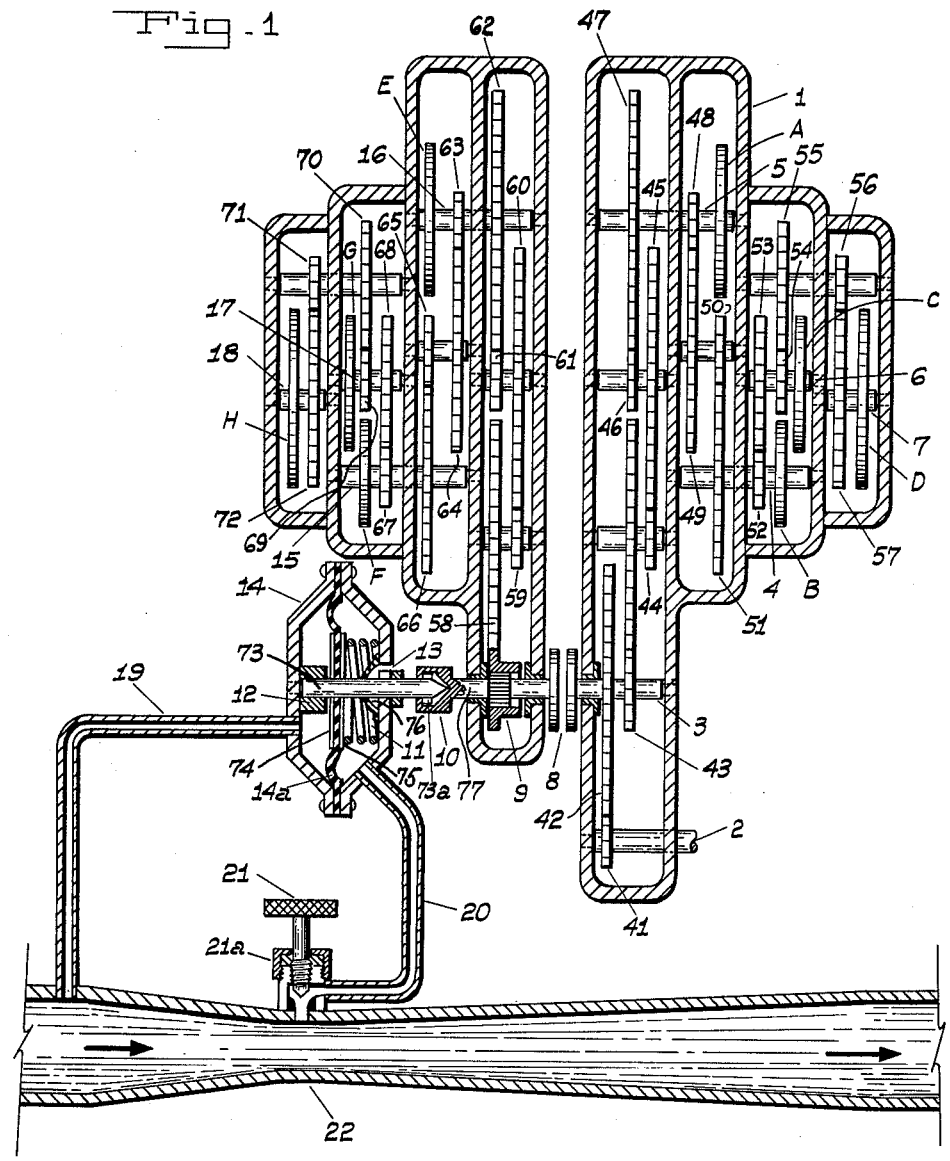
FIGURE 1 is an elevational view in section showing the two gear trains and the means for creating a head differential in the water flowing to the water softener.

Referring to the drawings in detail and to FIGURE 1 in particular, I have illustrated a Venturi tube indicated generally by the reference numeral 22 and comprising the usual inlet portion, throat and outlet. Associated with the Venturi tube is a diaphragm housing 14 which is formed to provide a chamber communicating through a conduit 19 with the inlet portion of the Venturi and a second chamber communicating through the conduit 20 through needle valve 21a with the Venturi throat. The two chambers are separated by a flexible and fluid tight diaphragm 14a. Compression spring 11 urges the diaphragm to the left toward stem guide 12. Water flowing through the Venturi tube creates a pressure differential wherein the pressure within the housing on the left side of diaphragm 14a (space connected to conduit 19) is greater than that on the right side of the diaphragm (space connected to conduit 20). This will urge the diaphragm to the right against the resistance of spring 11. As will be apparent to those skilled in the art the tension of spring 11 must be such that it will cause the diaphragm to move to the left when no water is flowing through the Venturi tube but permit its movement to the right a sufficient distance to engage clutch 8 when there is a flow in the Venturi tube. The rate at which the diaphragm responds to the pressure differential existing on the two sides of the diaphragm can be varied by means of the needle valve 21a. The rotation of knob 21 provides the means for adjusting the needle valve.

When the diaphragm moves to the right or left shaft 73 which is operatively connected to the diaphragm by means of discs 74 and 75 moves in the same direction. Seal 76 prevents water leakage from the chamber containing spring 11. In addition to a spring other resilient means may be employed such as rubber or other elastomer or an air bellows. The numeral 13 denotes an opening for the escape of air. A movement of shaft 73 causes a corresponding movement of shaft 77 which may be either a sliding keyed or splined shaft. If the movement to the right is of sufficient distance clutch 8 becomes engaged. Since shaft 77 will rotate when the clutch is engaged and shaft 73 cannot rotate, provision must be made for shaft 73 to engage shaft 77 in such a manner that the rotation of shaft 77 will present no difficulty. This is accomplished by connecting the two through the pivot bearing 10. When shaft 73 moves to the left the collar 73a around shaft 73 contacts the housing body of pivot bearing 10 causing shaft 77 to move to the left also. Other means may be employed to cause shaft 77 to move to the left and since such means will be readily apparent to those skilled in the art, those means will not be described.

The gear train on the right of FIGURE 1 is connected directly to a clock or other source of constant rotating speed such as a constant speed electrical motor through shaft 2. This particular gear train, cams, and electrical switches I will refer to as the clock timer gear train. In one embodiment of the invention gears 41 and 42 are so selected that shaft 3 rotates at a rate of one revolution per minute. The remaining gears are so selected in size that shafts 5, 4, 6 and 7 rotate at a rate of: one revolution in one hour, one in twelve hours, one in twenty-four hours and one in seven days respectively. Cams A mounted on shaft 5, B mounted on shaft 4, C mounted on shaft 6 and D mounted on shaft 7 rotate at the same speed as the shaft on which each is mounted.

As pointed out above the gear train illustrated on the left of FIGURE 1 will be set in motion only when clutch 8 is engaged. For simplicity I shall refer to this particular gear train as the flow timer gear train. The various gears are so chosen that cam E mounted on shaft 16, cam F mounted on shaft 15, cam G mounted on shaft 17, and cam H mounted on shaft 18 rotate at a rate of: one revolution in one hour, one in twelve hours, one in twenty-four hours and one in seven days respectively.

It might be well to point out in passing that if two tanks are used containing an ion exchange resin only the flow timer gear train is required. When such a system is used while one tank is being regenerated the other is used to soften the raw water. For further information as to the method of using two ion exchange tanks in parallel reference is hereby made to the copending application by Thomas H. Ennis and James E. Lamkin entitled "Method and Apparatus for Softening Water," Serial Number 60,465, filed October 4, 1960, which disclosure is hereby made a part of this application.

It should also be pointed out that the clock or other means providing a source of constant rotation would drive the flow timer gear through the clutch 8 when using the two ion tank arrangement. Naturally, the only time that movement will be imparted to the gear train is when sufficient pressure differential is created to deflect the diaphragm 14a and shaft 73 to the right engaging the clutch 8.

Figure 2:
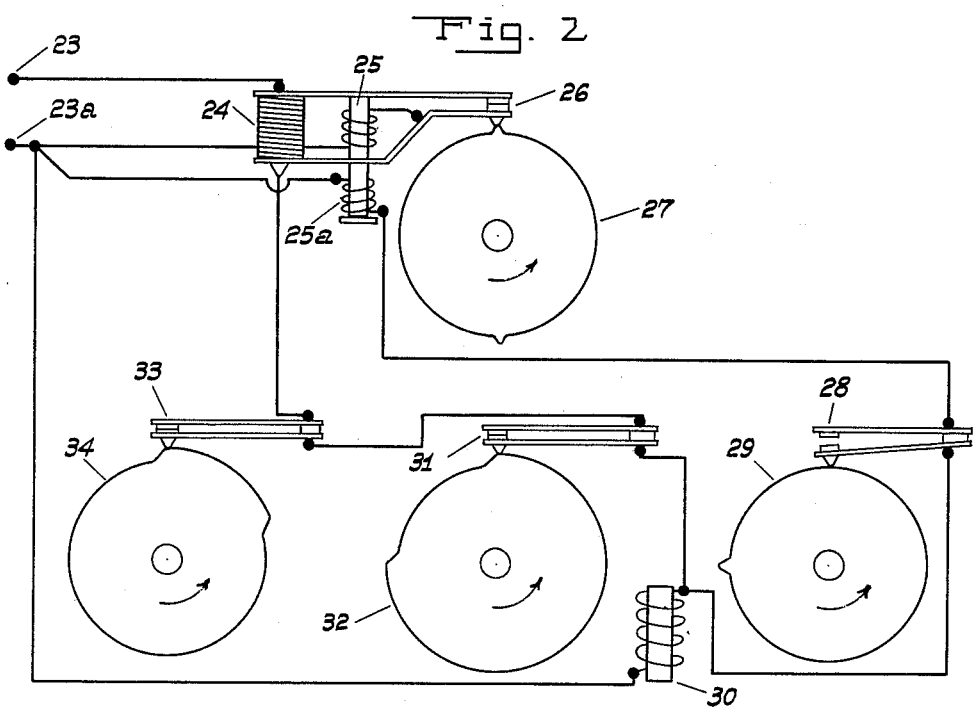
FIGURE 2 is a schematic view showing the cams and electrical hook-up when one tank containing the ion-exchange is used; and, FIGURE 3 is a schematic view showing the cams and electrical hook-up when two tanks containing the ion-change resin are used.

When on the other hand only one tank containing the ion exchange resin is to be used in the water softening system and it is to be contemplated that in the great majority of cases to be used the clock timer gear train must be used parallel to the flow timer gear train as illustrated in FIGURE 1. When so used and the flow timer gear train indicates regeneration is required a cam closes a switch which is in series with a switch on that cam in the clock timer gear train which revolves at the rate of one revolution in twenty-four hours. When this cam comes around to the early hours in the morning, it closes the switch completing the circuit effecting regeneration. FIGURE 2 is a schematic drawing showing the electrical hook-up required when one tank is used in the system for softening water.

Referring to FIGURE 2, numerals 23 and 23a indicate an A.C. supply. When cam 27, which corresponds to the cam rotating at a rate of one revolution in seven days on the flow timer gear train, causes contacts 26 to close those contacts will remain closed because solenoid 25 is activated by that closing. Now when cams 32 and 34, which correspond to the cams on the flow timer gear train which rotate at the rates of one revolution in one hour and one in twenty-four hours respectively close the contacts 31 and 33, the circuit is complete the ion exchange tank will be subjected to the regeneration cycle followed by the backwash cycle. When cam 29, which corresponds to the cam on the clock timer gear train which rotates at a rate of one revolution per hour, causes contacts 28 to close solenoid 25a is activated overpowering solenoid 25 and thus opening contacts 26. Since the three contacts 26, 31 and 33 must be simultaneously closed before regeneration will occur, this opening of contacts 26 stops the regeneration and backwash cycles and returns the system to service. It should be noted that the gear trains illustrated in FIGURES 2 and 3 are not the same as that illustrated in FIGURE 1.

Figure 3:
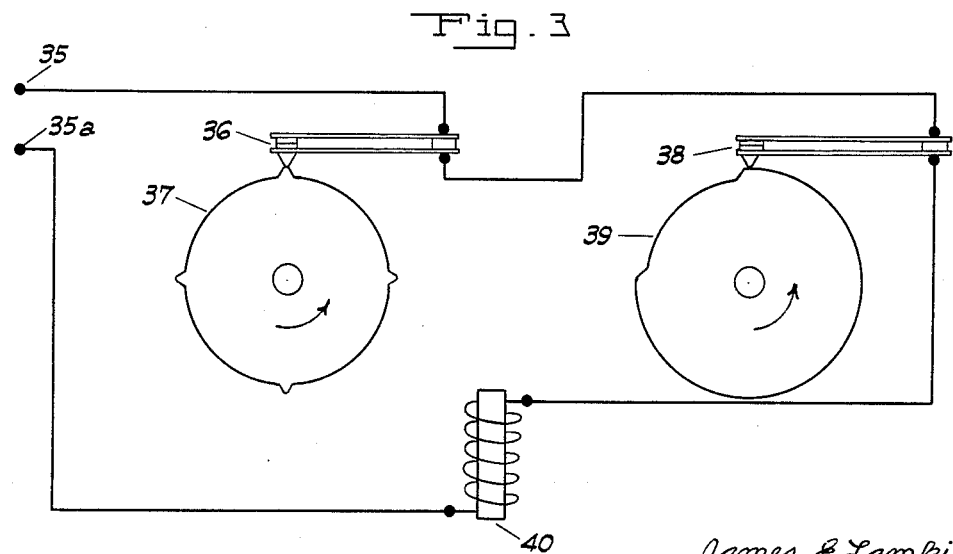

If two tanks each containing an ion exchange resin are employed, an electrical system in conjunction with cams such as illustrated in FIGURE 3 may be used. Cam 39 rotates at a rate of one revolution per hour and cam 37 rotates at a rate of one revolution per seven days. Numerals 53 and 35a indicates an A.C. power source. When both contacts 36 and 38 are closed the regeneration cycle begins followed by backwash cycle, and when cam 39 has turned until contact 38 are open the circuit is broken and that particular tank is returned to a state of readiness for service when the second tank is placed on the regeneration cycle. If more precise control is desired, a third cam may be incorporated in the system illustrated in FIGURE 3 which will rotate at a rate of one revolution in twenty-four hours.

Other modes of applying the principle of the invention may be employed, change being made as regards the details described, provided the features stated in any of the following claims or the equivalent of such be employed.

I, therefore, particularly point out and distinctly claim as my invention:

1, Control means for an automatic water softener apparatus having a cycle of operation including the three stages of from service to regeneration, from regeneration to backwash and from backwash back to service comprising: a conduit, means in said conduit for creating a head differential in the water flowing through said conduit, a first gear train including a driving means, a plurality of driven cam wheels mounted in series and switch means having followers riding said cam wheels for breaking and making electrical contact, a second gear train including a plurality of driven cam wheels mounted in series and switch means having followers riding said cam wheels for breaking and making electrical contact wherein said second gear train is connected to said driving means through a clutch, means responsive to variations in said head differential whereby said clutch is engaged and disengaged in response to said head differential thus driving said second gear train only when said clutch is engaged, said means including a flexible diaphragm operably connected with said means for creating a head differential and electrical interconnecting means between the switch means included in said first and second gear trains whereby said cycle of operation is controlled by a combination of time and the quantity of water flowing through said conduit.

2. Control means for an automatic water softener apparatus having a cycle of operation including the three stages of from service to regeneration, from regeneration to backwash, and from backwash back to service comprising:
(1) a conduit,
(2) a venturi tube in said conduit for creating a head differential in the water flowing therethrough,
(3) a first gear train including
 (a) a driving means,
 (b) a plurality of driven cam wheels mounted in series,
 (c) and switch means having followers riding cam wheels for breaking and making electrical contact,
(4) a second gear rain including
 (a) a plurality of driven cam wheels mounted in series
 (b) and switch means having followers riding said cam wheels for breaking and making electrical contact,
(5) clutch means connecting said second gear train with said driving means,
(6) means responsive to variations in said head differential whereby said clutch means is engaged and disengaged thus driving said second gear train only when said clutch means is engaged, said means including
 (a) a flexible diaphragm
 (b) a pair of conduits connecting said diaphragm with said venturi tube, the arrangement being such that one side of said diaphragm is connected to the throat and the other side to the inlet of said venturi tube, and
(7) electrical interconnecting means between the switch means included in said first and second gear trains whereby said cycle of operation is controlled by a combination of time and the quantity of water flowing through said conduit.

3. Control means for an automatic water softener apparatus having a cycle of operation including the three stages of from service to regeneration, from regeneration to backwash, and from backwash to service comprising:
(1) a conduit,
(2) a venturi tube in said conduit for creating a head differential in the water flowing therethrough,
(3) a first gear train including
 (a) a driving means,
 (b) a plurality of driven cam wheels mounted in series,
 (c) and switch means having followers riding cam wheels for breaking and making electrical contact,
(4) a second gear train including
 (a) a plurality of driven cam wheels mounted in series
 (b) and switch means having followers riding said cam wheels for breaking and making electrical contact,
(5) clutch means connecting said second gear train with said driving means,
(6) means responsive to variations in said head differential whereby said clutch means is engaged and disengaged thus driving said second gear train only when said clutch means is engaged, said means including
 (a) a flexible diaphragm,
 (b) a pair of conduits connecting said diaphragm with said venturi tube, the arrangement being such that one side of said diaphragm is connected to the throat and the other side to the inlet of said venturi tube, and
 (c) a resilient member urging said diaphragm in a direction tending to disengage said clutch means, and
(7) electrical interconnecting means between the switch means included in said first and second gear trains whereby said cycle of operation is controlled by a combination of time and the quantity of water flowing through said conduit.

4. Control means for an automatic water softener apparatus having a cycle of operation including the three stages of from service to regeneration, from regeneration to backwash, and from backwash to service comprising:
(1) a conduit,
(2) a venturi tube in said conduit for creating a head differential in the water flowing therethrough,
(3) a first gear train including
 (a) a driving means,
 (b) a plurality of driven cam wheels mounted in series,
 (c) and switch means having followers riding cam wheels for breaking and making electrical contact,
(4) a second gear train including
 (a) a plurality of driven cam wheels mounted in series,
 (b) and switch means having followers riding said cam wheels for breaking and making electrical contact,
(5) clutch means connecting said second gear train with said driving means,
(6) means responsive to variations in said head differential whereby said clutch means is engaged and disengaged thus driving said second gear train only when said clutch means is engaged, said means including
 (a) a flexible diaphragm
 (b) a pair of conduits connecting said diaphragm with said venturi tube, the arrangement being such that one side of said diaphragm is connected to the throat and the other side to the inlet of venturi tube, and
 (c) a resilient member urging said diaphragm in a direction tending to disengage said clutch means, and
(7) said clutch means including
 (a) a pair of clutch members adapted to be engaged, and
 (b) means connecting said diaphragm with one of said clutch members including
  (i) a first shaft secured to said diaphragm and adapted for movement therewith,
  (ii) a second shaft attached to one of said clutch members and adapted for movement therewith, and
  (iii) pivot bearing means interconnecting said first and second shafts,
(8) electrical interconnecting means between the switch means included in said first and second gear trains whereby said cycle of operation is controlled by a combination of time and the quantity of water flowing through said conduit.

References Cited in the file of this patent
UNITED STATES PATENTS

| | | |
|---|---|---|
| 529,365 | Connet et al. | Nov. 20, 1894 |
| 763,047 | Corey | June 21, 1904 |
| 2,754,057 | Stahl | July 10, 1956 |